US012756096B2

(12) United States Patent
Liu et al.

(10) Patent No.: US 12,756,096 B2
(45) Date of Patent: Oct. 6, 2026

(54) AIR INTERFACE ELECTRICALLY TUNABLE METASURFACE AND RADIATION DEVICE

(71) Applicant: ZTE CORPORATION, Shenzhen (CN)

(72) Inventors: Feng Liu, Shenzhen (CN); Zhipeng Zhao, Shenzhen (CN); Liang Liu, Shenzhen (CN); Lei Sun, Shenzhen (CN); Nan Shen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 204 days.

(21) Appl. No.: 18/857,255

(22) PCT Filed: Apr. 25, 2023

(86) PCT No.: PCT/CN2023/090631
§ 371 (c)(1),
(2) Date: Oct. 16, 2024

(87) PCT Pub. No.: WO2023/216875
PCT Pub. Date: Nov. 16, 2023

(65) Prior Publication Data

US 2026/0031535 A1 Jan. 29, 2026

(30) Foreign Application Priority Data

May 7, 2022 (CN) ......................... 202210489719.0

(51) Int. Cl.
*H01Q 3/36* (2006.01)

(52) U.S. Cl.
CPC .................................... *H01Q 3/36* (2013.01)

(58) Field of Classification Search
CPC ...... H01Q 3/26; H01Q 21/061; H01Q 15/148; H04B 7/15528; H04B 7/0617
(Continued)

(56) References Cited

U.S. PATENT DOCUMENTS 12,525,727 B2 * 1/2026 Kim ....................... H01Q 21/24
2007/0290939 A1 * 12/2007 Teshirogi ............. H01Q 19/108
343/700 MS
(Continued)

FOREIGN PATENT DOCUMENTS

CN 105006649 A 10/2015
CN 108832304 A 11/2018
(Continued)

OTHER PUBLICATIONS

International Searching Authority. International Search Report and Written Opinion for PCT Application No. PCT/CN2023/090631 and English translation, mailed Jun. 24, 2023, pp. 1-10.
(Continued)

*Primary Examiner* — Nuzhat Pervin
(74) *Attorney, Agent, or Firm* — Vivacqua Crane, PLLC

(57) ABSTRACT

Disclosed are an air-interface electrically-tunable metasurface and a radiation apparatus. The air-interface electrically-tunable metasurface may include: a dielectric substrate, including a plurality of dielectric substrate units; and a metal structure array, including a plurality of metal structures arranged on the dielectric substrate units and one to one corresponding to positive/negative 45-degree dual-polarized antenna units, the metal structure includes two metal units and a microwave diode, each metal unit includes two axisymmetrically distributed metal sheets, the two metal units are symmetrically distributed around a center of the positive/negative 45-degree dual-polarized antenna unit, and the metal sheets and the microwave diode cooperate to adjust a phase of a positive 45-degree polarized or negative 45-degree polarized electromagnetic wave signal emitted by the positive/negative 45-degree dual-polarized antenna unit.

20 Claims, 7 Drawing Sheets

(58) Field of Classification Search
USPC .......................................................... 342/371
See application file for complete search history.

(56) References Cited

U.S. PATENT DOCUMENTS

| | | | | |
|---|---|---|---|---|
| 2011/0001682 | A1* | 1/2011 | Rao | H01Q 9/0414 343/893 |
| 2015/0070243 | A1* | 3/2015 | Kish | H01Q 21/205 343/876 |
| 2017/0062945 | A1* | 3/2017 | Foo | H01Q 25/008 |
| 2020/0044365 | A1* | 2/2020 | Song | H01Q 5/392 |
| 2020/0176864 | A1* | 6/2020 | Baek | H01Q 3/46 |
| 2020/0381835 | A1* | 12/2020 | Chou | H01Q 15/14 |
| 2021/0135364 | A1* | 5/2021 | Yamada | H01Q 1/243 |
| 2021/0151877 | A1* | 5/2021 | Towfiq | H01Q 3/2617 |
| 2022/0109245 | A1* | 4/2022 | Yang | H01Q 3/245 |
| 2023/0336237 | A1* | 10/2023 | Hormis | H04B 7/08 |

FOREIGN PATENT DOCUMENTS

| | | | | | |
|---|---|---|---|---|---|
| CN | 111987469 | B | | 3/2020 | |
| CN | 111063994 | A | * | 4/2020 | H01Q 21/06 |
| CN | 111864399 | A | | 10/2020 | |
| CN | 111987469 | A | | 11/2020 | |
| CN | 112436285 | A | | 3/2021 | |
| CN | 114361782 | A | * | 4/2022 | H01Q 21/00 |
| EP | 3300172 | A1 | | 3/2018 | |
| EP | 3130037 | B1 | * | 8/2019 | H01Q 21/24 |
| WO | WO-2017177495 | A1 | * | 10/2017 | G04R 60/06 |
| WO | WO-2017177927 | A1 | * | 10/2017 | H01Q 21/24 |
| WO | 2018096306 | A1 | | 5/2018 | |

OTHER PUBLICATIONS

European Patent Office. Extended European Search Report for EP Application No. 23802649.6, mailed Aug. 11, 2025, pp. 1-7.

Japan Patent Office. Notice of Reasons for Refusal and Search Report for JP Application No. 2024-562120 and English translation, mailed Aug. 27, 2025, pp. 1-32.

N. Zhang et al., “A Dual-Polarized Reconfigurable Reflectarray Antenna Based on Dual-Channel Programmable Metasurface,” in IEEE Transactions on Antennas and Propagation, Apr. 13, 2022, vol. 70, No. 9, pp. 7403-7412, doi: 10.1109/TAP.2022.3165872.

Zhanni Wu et al., “Space-Time Modulated Metasurfaces with Spatial Discretization: Free-Space N-path Systems”, arxiv.org, Nov. 15, 2020, Cornell University Library, 201Olin Library Cornell University Ithaca, NY.

* cited by examiner

AIR INTERFACE ELECTRICALLY TUNABLE METASURFACE AND RADIATION DEVICE

CROSS-REFERENCE TO RELATED APPLICATION

This application is a national stage filing under 35 U.S.C. § 371 of international application number PCT/CN2023/090631, filed Apr. 25, 2023, which claims priority to Chinese patent application No. 202210489719.0 filed May 7, 2022. The contents of these applications are incorporated herein by reference in their entirety.

TECHNICAL FIELD

The present disclosure relates to the technical field of wireless communication, and more particularly, to an air-interface electrically-tunable metasurface and a radiation apparatus.

BACKGROUND

In the antenna system of a base station, antenna beam coverage is a crucial reference indicator for evaluating system performance, and its characteristics are closely linked to indicators such as beam switching and gain coverage. In the current implementation scheme, beam switching of a base station antenna is mainly achieved through digital electrical tuning or mechanical electrical tuning. A digitally electrically tuned antenna offers high scheduling flexibility, fast response, and a low link loss, but the introduction of digital components into the link results in high overall costs. On the other hand, a mechanically electrically tuned antenna achieves beam switching through motor transmission, which provides lower scheduling flexibility, slower response, and a higher link loss. Regardless of whether a digitally electrically tuned antenna or a mechanically electrically tuned antenna is used, beam switching is implemented on a circuit at the rear end of the antenna array. As a result, a feeding network of the antenna array is complex, and the insertion loss of the antenna system is increased.

SUMMARY

The following is an overview of a subject matter described in detail herein. This overview is not intended to limit the protection scope of the claims.

Embodiments of this application provide an air-interface electrically-tunable metasurface and a radiation apparatus.

In accordance with a first aspect, an embodiment of the present disclosure provides an air-interface electrically-tunable metasurface. The metasurface includes: a dielectric substrate, including a plurality of dielectric substrate units; and a metal structure array, including a plurality of metal structures arranged on the dielectric substrate units and one to one corresponding to positive/negative 45-degree dual-polarized antenna units, where the metal structure includes two metal units and a microwave diode, each metal unit includes two axisymmetrically distributed metal sheets, the two metal units are symmetrically distributed around a center of the positive/negative 45-degree dual-polarized antenna unit, and the metal sheets and the microwave diode cooperate to adjust a phase of a positive 45-degree polarized or negative 45-degree polarized electromagnetic wave signal emitted by the positive/negative 45-degree dual-polarized antenna unit.

In accordance with a second aspect, an embodiment of the present disclosure provides a radiation apparatus, including: a multi-channel dual-polarized antenna array and the air-interface electrically-tunable metasurface in the first aspect. The multi-channel dual-polarized antenna array includes a plurality of positive/negative 45-degree dual-polarized antenna units configured to emit an electromagnetic wave signal, and the air-interface electrically-tunable metasurface is arranged directly above a radiation direction of the multi-channel dual-polarized antenna array to adjust a phase of the electromagnetic wave signal emitted by the multi-channel dual-polarized antenna array.

Additional features and advantages of the present disclosure will be outlined in the following description, and in part will be apparent from the description, or may be learned by the practice of the present disclosure. The objects and other advantages of the present disclosure can be achieved and obtained by the structures particularly pointed out in the description, claims and drawings.

BRIEF DESCRIPTION OF DRAWINGS

The drawings are provided to further explain the technical aspects of the present disclosure and are considered part of the specification. The drawings and the embodiments of the present disclosure are intended to illustrate the technical aspects but are not meant to limit them.

REFERENCE NUMERALS

1: multi-channel dual-polarized antenna array; 2: air-interface electrically-tunable metasurface; 11: positive/negative 45-degree dual-polarized antenna unit; 12: antenna dielectric substrate; 13: multi-channel dual-polarized antenna array unit; 100: metal structure; 110: metal sheet; 120: microwave diode; 130: metal via hole; 140: metal pad; and 200: dielectric substrate unit.

DETAILED DESCRIPTION

To make the objects, technical schemes, and advantages of the present disclosure clear, the present disclosure is described in further detail in conjunction with accompanying drawings and examples. It should be understood that the specific embodiments described herein are merely illustrative and are not intended to limit the scope of the present disclosure.

In the descriptions of the present disclosure, it is to be noted that, an orientation or a position relationship indicated by the term such as "center," "up," or "down," refer to an orientation or a position relationship shown based on an accompanying drawing, which is used only to facilitate description of the present disclosure and simplify description, but is not used to indicate or imply that a related apparatus or element needs to have a specific orientation or needs to be constructed and operated based on a specific orientation, and therefore, cannot be understood as a limitation to the present disclosure. The terms "first," "second," and "third" are used merely for a description purpose, and cannot be understood as indicating or implying relative importance. In addition, unless otherwise specified and limited, the terms "mounted", "connected", "coupled" and the like are used broadly, and may be, for example, fixed connections, detachable connections, or integral connections; may also be mechanical connections, or electric connections; may also be direct connections, or indirect connections via intervening structures; may also be inner communications of two elements. The specific meaning of these terms within the context of the present disclosure may be understood by those having ordinary skills in the art according to particular circumstances.

Figure 1:
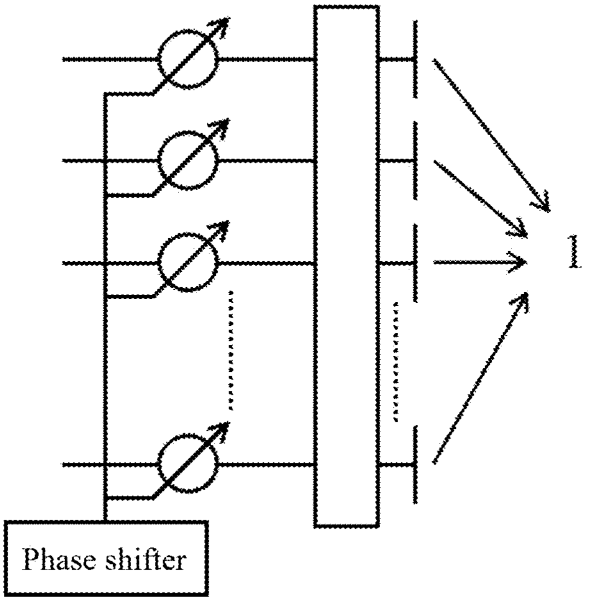
FIG. 1 is a schematic structural diagram of conventional base station antenna beam switching according to the present disclosure.

In the related technology, to implement beam switching in a channel, each channel needs to be loaded with a phase shifter to implement beam deflection/switching. As shown in FIG. 1, in a multi-channel dual-polarized antenna array 1, beam switching requires the use of phase shifters corresponding in number to the antenna units. Phase distribution between the antenna units is changed by adjusting a phase shifter network at a rear end of the antennas, to implement antenna beam switching. In a current implementation scheme, beam switching of a base station antenna is mainly implemented through digital electric tuning or mechanical electric tuning. However, regardless of a digitally electrically tuned antenna or a mechanically electrically tuned antenna, beam switching is implemented on a phase shifter circuit at the rear end of the multi-channel dual-polarized antenna array 1. Consequently, a feeding network at the rear end of the multi-channel dual-polarized antenna array 1 is complex, and an insertion loss of an antenna system is increased.

Alternatively, beam switching may be implemented by loading a lens or a metamaterial surface at an air interface above the antennas. However, current air-interface electrically-tunable metasurfaces are mainly used for a single-polarized antenna unit or a linear array, which cannot well meet a beam deflection requirement of the multi-channel dual-polarized antenna array 1 in a base station system.

To implement beam switching of each channel, reduce the complexity of the rear-end feeding network of the multi-channel dual-polarized antenna array 1 caused by the conventional electric tuning manner, and reduce the insertion loss of the antenna system, the present disclosure proposes an air-interface electrically-tunable metasurface. With reference to FIG. 2 to FIG. 12, the air-interface electrically-tunable metasurface 2 includes:

- a dielectric substrate, including a plurality of dielectric substrate units 200; and
- a metal structure array, including a plurality of metal structures 100, where the metal structures 100 are arranged on the dielectric substrate units 200 and are one to one corresponding to positive/negative 45-degree dual-polarized antenna units 11, the positive/negative 45-degree dual-polarized antenna units 11 are arranged in the multi-channel dual polarized antenna array 1, the metal structure 100 includes two metal units and a microwave diode 120, each metal unit includes two axisymmetrically distributed metal sheets 110, the two metal units are symmetrically distributed around a center of the positive/negative 45-degree dual-polarized antenna unit 11, and the metal sheets 110 and the microwave diode 120 cooperate to adjust a phase of a positive 45-degree polarized or negative 45-degree polarized electromagnetic wave signal emitted by the positive/negative 45-degree dual-polarized antenna unit 11.

Herein, it is to be noted that the air-interface electrically-tunable metasurface 2 in this embodiment of the present disclosure is applied to the multi-channel dual-polarized antenna array 1. The multi-channel dual-polarized antenna array 1 is divided into a plurality of multi-channel dual-polarized antenna array units 13, and the multi-channel dual-polarized antenna array unit 13 includes a plurality of positive/negative 45-degree dual-polarized antenna units 11. Two channels may be formed through division in one multi-channel dual-polarized antenna array unit 13, and one multi-channel dual-polarized antenna array unit 13 corresponds to one metal structure array unit formed through division in one metal structure array. In the present disclosure, adjacent metal structures 100 refer to two metal structures 100 located adjacent to each other in one metal structure array, and the microwave diode 120 may be a variable-capacitance diode.

In accordance with the air-interface electrically-tunable metasurface 2 designed in this embodiment of the present disclosure, a metal structure 100 in a corresponding metal structure array unit corresponds to a positive/negative 45-degree dual-polarized antenna unit 11 in the multi-channel dual-polarized antenna array 1. The metal structure 100 includes two metal units and a microwave diode 120, each metal unit includes two axisymmetrically distributed metal sheets 110, and the two metal units are symmetrically distributed around a center of the positive/negative 45-degree dual-polarized antenna unit 11. Therefore, in this embodiment of the present disclosure, a capacitance value of the microwave diode 120 can be adjusted by controlling a magnitude of a direct current bias voltage value applied across two ends of the microwave diode 120 in the metal structure, to adjust a phase of a positive 45-degree polarized or negative 45-degree polarized electromagnetic wave signal emitted by the positive/negative 45-degree dual-polarized antenna unit 11. Finally, deflected phase values obtained after electromagnetic wave signals emitted by positive/negative 45-degree dual-polarized antenna units 11 corresponding to adjacent metal structures 100 pass through the adjacent metal structures 100 are controlled to have a fixed difference, to implement beam deflection of the entire multi-channel dual-polarized antenna array 1.

In this embodiment of the present disclosure, the phase shifters are replaced with corresponding metal structures 100. Therefore, this embodiment of the present disclosure has advantages of reducing the complexity of the rear-end feeding network of the multi-channel dual-polarized antenna array 1 and reducing the system insertion loss. The air-interface electrically-tunable metasurface 2 designed in this embodiment of the present disclosure can process positive 45-degree polarized electromagnetic wave signals or negative 45-degree polarized electromagnetic wave signals, and can also handle a situation where the positive/negative 45-degree dual-polarized antenna units 11 simultaneously emit positive 45-degree polarized and negative 45-degree polarized electromagnetic wave signals. Herein, it can be understood that both of the positive 45-degree polarized and negative 45-degree polarized electromagnetic wave signals have the same downtilt angle after adjusted by the air-interface electrically-tunable metasurface 2. Therefore, compared with a metal structure, mainly used for a single-polarized antenna unit or a linear array, of an existing air-interface electrically-tunable metasurface, this embodiment of the present disclosure can handle deflection of electromagnetic wave signals of a plurality of channels, to increase a gain of the multi-channel dual-polarized antenna array 1, improve product reliability of the multi-channel dual-polarized antenna array 1, and meet actual requirements of the multi-channel dual-polarized antenna array 1 in a base station.

Figure 2:
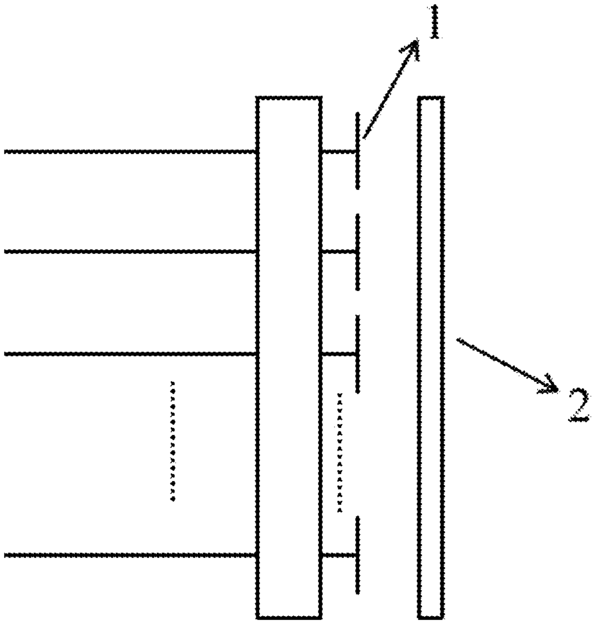
FIG. 2 is a schematic structural diagram of air-interface electrically-tunable beam switching according to an embodiment of the present disclosure.

With reference to FIG. 2, to better receive an electromagnetic wave signal of the multi-channel dual-polarized antenna array 1 and meet an air interface requirement, the air-interface electrically-tunable metasurface 2 in this embodiment of the present disclosure is arranged directly above a radiation direction of the multi-channel dual-polarized antenna array 1, and a height of the air-interface electrically-tunable metasurface 2 from the multi-channel dual-polarized antenna array 1 does not exceed 0.25 wavelength.

Figure 3:
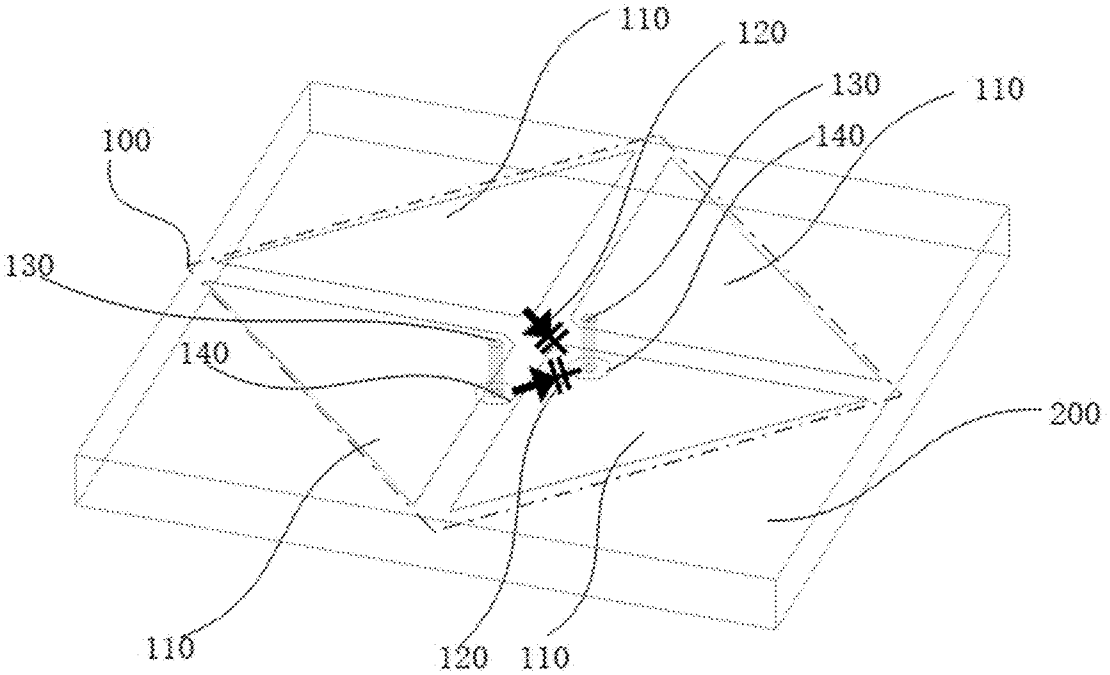
FIG. 3 is a schematic perspective diagram of a metal structure with metal sheets arranged in isosceles trapezoids and diodes arranged in different layers according to an embodiment of the present disclosure.
Figure 4:
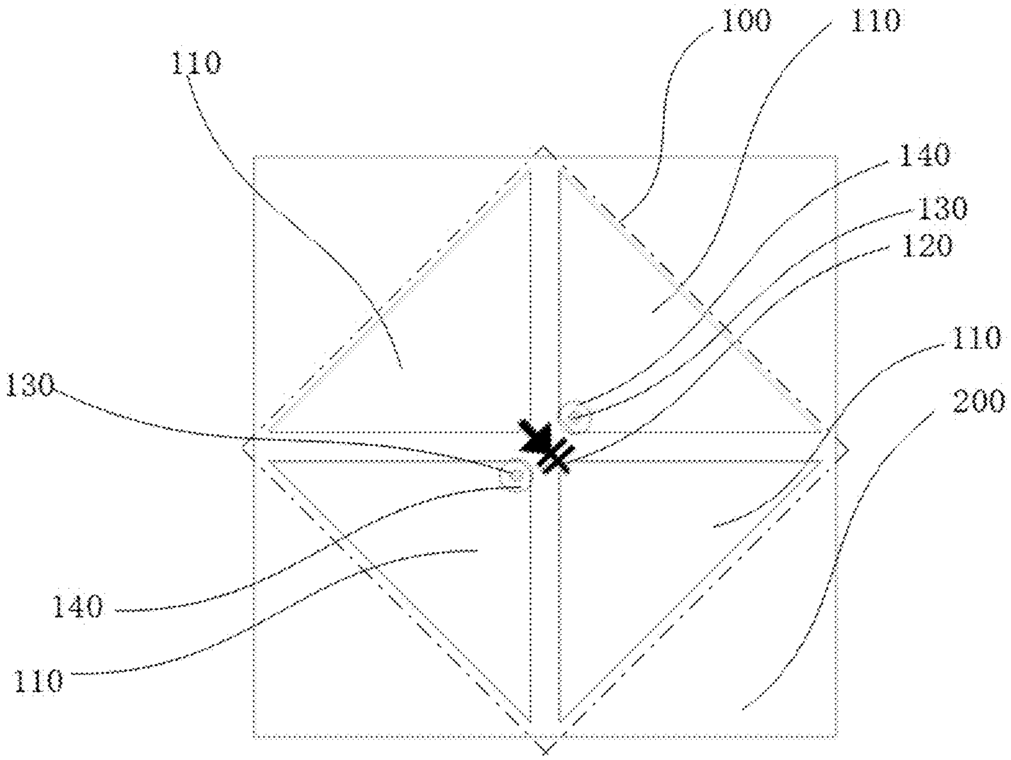
FIG. 4 is a top view of a metal structure with metal sheets arranged in isosceles trapezoids and diodes arranged in different layers according to an embodiment of the present disclosure.

To better adjust the positive 45-degree polarized electromagnetic wave signal or the negative 45-degree polarized electromagnetic wave signal emitted by the positive/negative 45-degree dual-polarized antenna unit 11, as shown in FIG. 3 and FIG. 4, a metal sheet 110 in a metal unit in the metal structure 100 may be in a shape of an isosceles trapezoid, upper bases of two adjacent metal sheets 110 in the metal structure 100 are perpendicular to each other, and upper bases of all metal sheets 110 in the metal structure 100 form a regular quadrilateral with four gaps. The upper base is a shorter side of two parallel sides of the isosceles trapezoid. A reason for such an arrangement is that the regular quadrilateral with four gaps that is formed by the upper bases of the metal sheets 110 in the metal structure 100 has a larger reception area and can better adjusts the phase of the electromagnetic wave signal than a quadrilateral formed by other sides of isosceles trapezoids.

Figure 7:
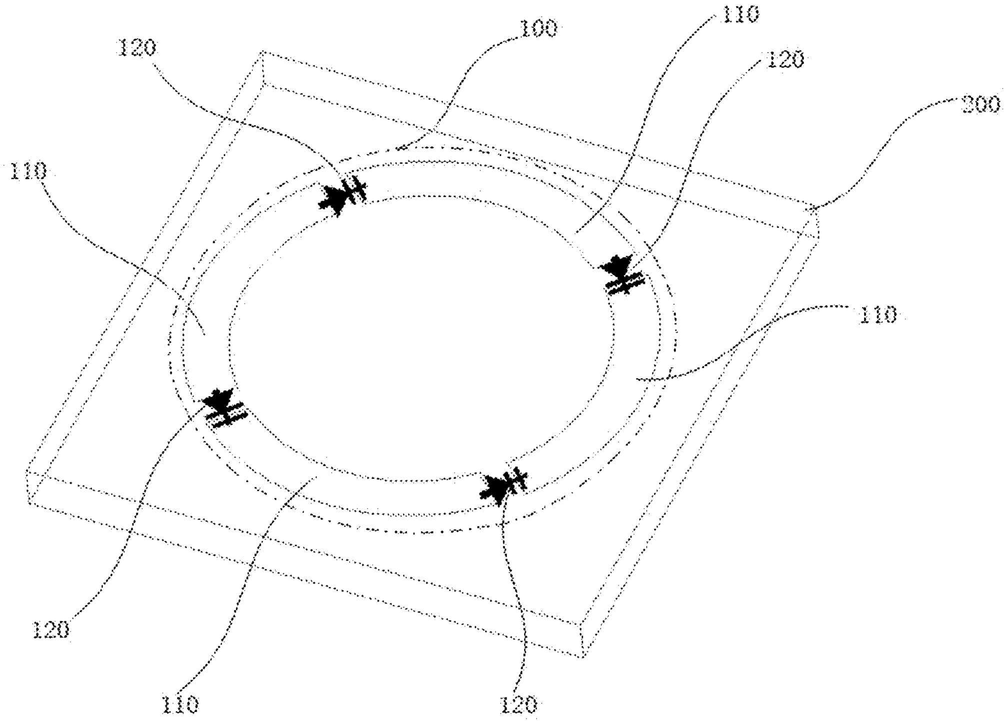
FIG. 7 is a schematic perspective diagram of a metal structure with metal sheets arranged in sectors in the same layer and diodes arranged in the same layer according to an embodiment of the present disclosure.
Figure 8:
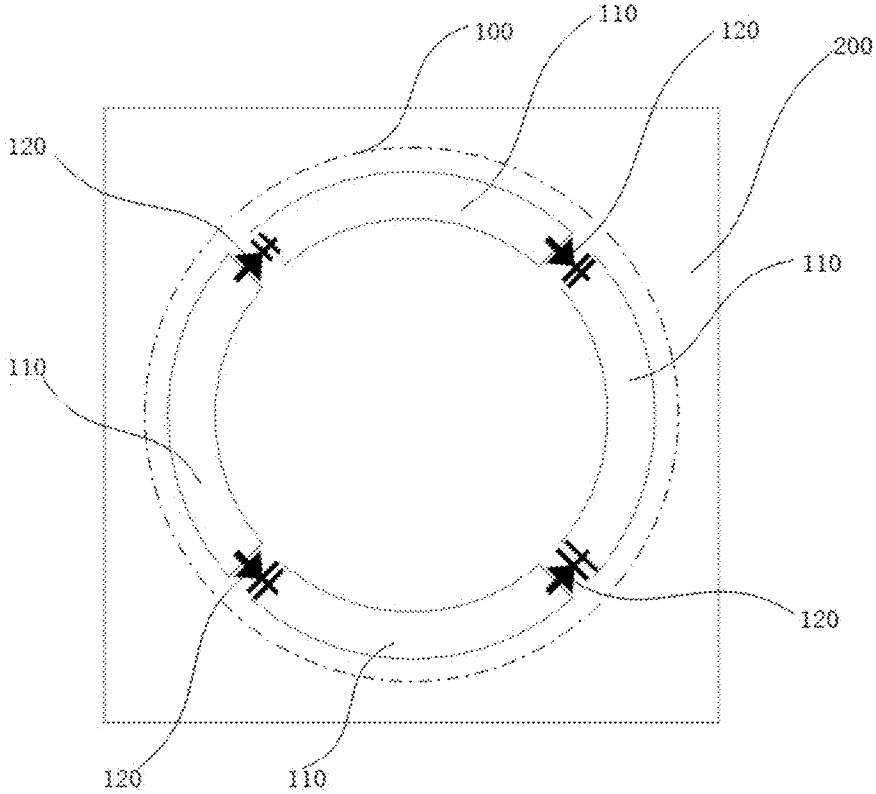
FIG. 8 is a top view of a metal structure with metal sheets arranged in sectors in the same layer and diodes arranged in the same layer according to an embodiment of the present disclosure.
Figure 9:
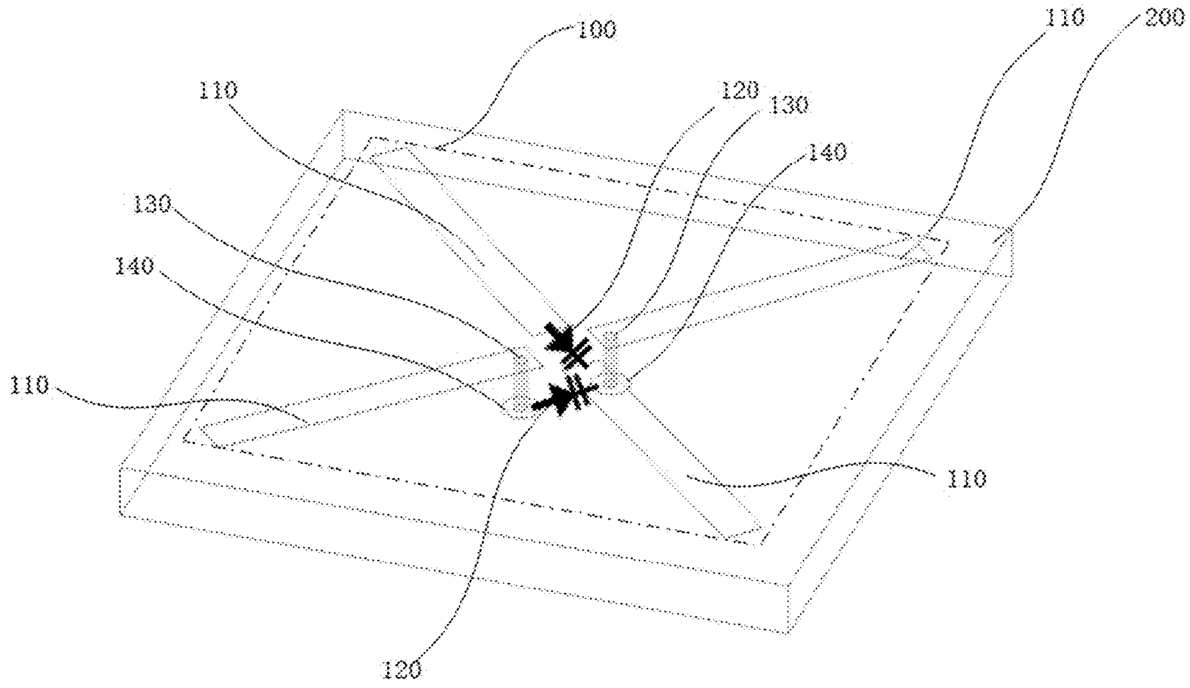
FIG. 9 is a schematic perspective diagram of a metal structure with metal sheets arranged in rectangles and diodes arranged in different layers according to an embodiment of the present disclosure.
Figure 10:
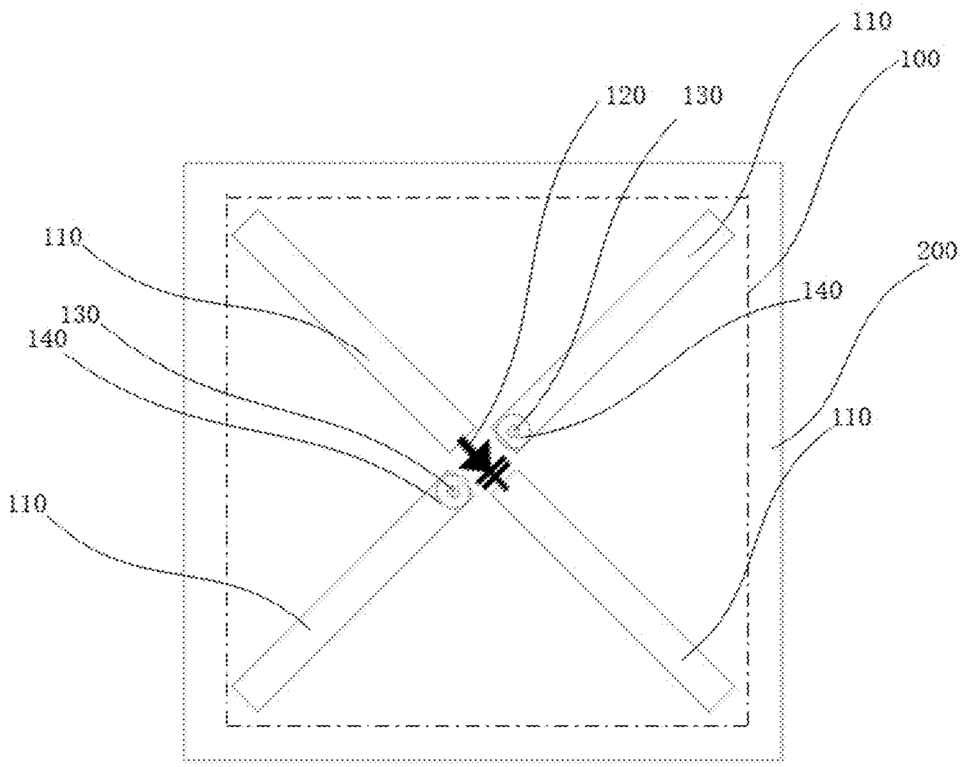
FIG. 10 is a top view of a metal structure with metal sheets arranged in rectangles and diodes arranged in different layers according to an embodiment of the present disclosure.

To better receive the positive 45-degree polarized electromagnetic wave signal or the negative 45-degree polarized electromagnetic wave signal emitted by the positive/negative 45-degree dual-polarized antenna unit 11, as shown in FIG. 7 and FIG. 8, the metal sheet 110 in the metal structure 100 may alternatively be in a shape of a sector, and a 90-degree angle is formed between two adjacent metal sheets 110 in the metal structure 100. The 90-degree angle means that an angle between straight lines determined by a symmetry center and centers of two adjacent metal sheets 110, i.e., two adjacent sectors is 90 degrees, and arcs of all the metal sheets 110 in the metal structure 100 form a circle with four gaps, and a center of the circle is the symmetry center of the four metal sheets 110. Alternatively, considering an area of the metal sheet 110 and costs of the metal sheet 110, as shown in FIG. 9 and FIG. 10, the metal sheet 110 in the metal structure 100 may alternatively be in a shape of a rectangle, and short sides of all the metal sheets 110 in the metal structure 100 form a regular quadrilateral with four gaps. The short side is one of two shorter sides of the metal sheet 110. A reason for using the short sides to form a regular quadrilateral is to better adjust the phase of the electromagnetic wave signal. It is to be noted that when the metal sheet 110 in the metal structure 100 shown in FIG. 9 and FIG. 10 is in the shape of a rectangle, to ensure that the air-interface electrically-tunable metasurface 2 in this embodiment of the present disclosure can adjust the phase of the electromagnetic wave signal emitted by the multi-channel dual-polarized antenna array 1, so as to implement beam deflection, when the metal sheet 110 is in the shape of a rectangle, straight lines determined by geometric centers of two pairs of symmetrical metal sheets 110 may be arranged respectively parallel to positive 45-degree and negative 45-degree polarized antennas below.

A shape of the metal sheet 110 in this embodiment of the present disclosure is not limited to the isosceles trapezoid, the sector, or the rectangle, and may also be other proper shapes. Those having ordinary skills in the art may choose depending on their own needs.

To reduce costs of using a microwave diode 120 in a metal structure 100, the metal structure 100 shown in FIG. 3 and FIG. 4 may be used. As shown in FIG. 3 and FIG. 4, the metal structure 100 includes two microwave diodes 120, the two metal units are arranged on the same plane of a corresponding dielectric substrate unit 200, and the two microwave diodes 120 are respectively arranged on upper and lower planes of the dielectric substrate unit 200. Two metal sheets 110 in each metal unit are connected by one of the microwave diodes 120, the two metal units are respectively connected to positive and negative electrodes of a direct current bias power supply, and the two microwave diodes 120 are arranged in parallel.

With further reference to the metal structure 100 shown in FIG. 3 and FIG. 4, in an embodiment of the present disclosure, two metal sheets 110 in one of the metal units are connected by one microwave diode 120 arranged on the same plane, and two metal sheets 110 in the other metal unit are each provided with a metal via hole 130. Each metal via hole 130 corresponds to a metal pad 140 provided on the lower plane of the dielectric substrate unit 200, and the two metal via holes 130 are connected through the two metal pads 140 to the other microwave diode 120 arranged on the lower plane. Directions of forward current of the two microwave diodes 120 are different, and correspond to positive 45-degree polarization and negative 45-degree polarization, respectively.

Figure 5:
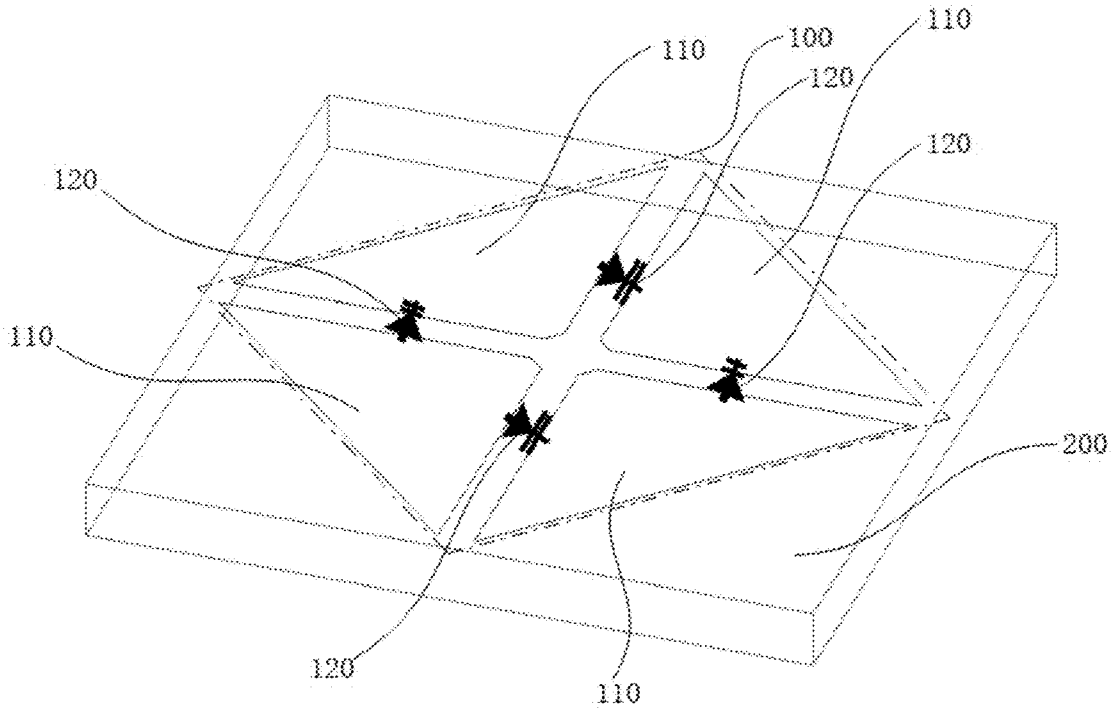
FIG. 5 is a schematic perspective diagram of a metal structure with metal sheets arranged in isosceles trapezoids and diodes arranged in the same layer according to an embodiment of the present disclosure.
Figure 6:
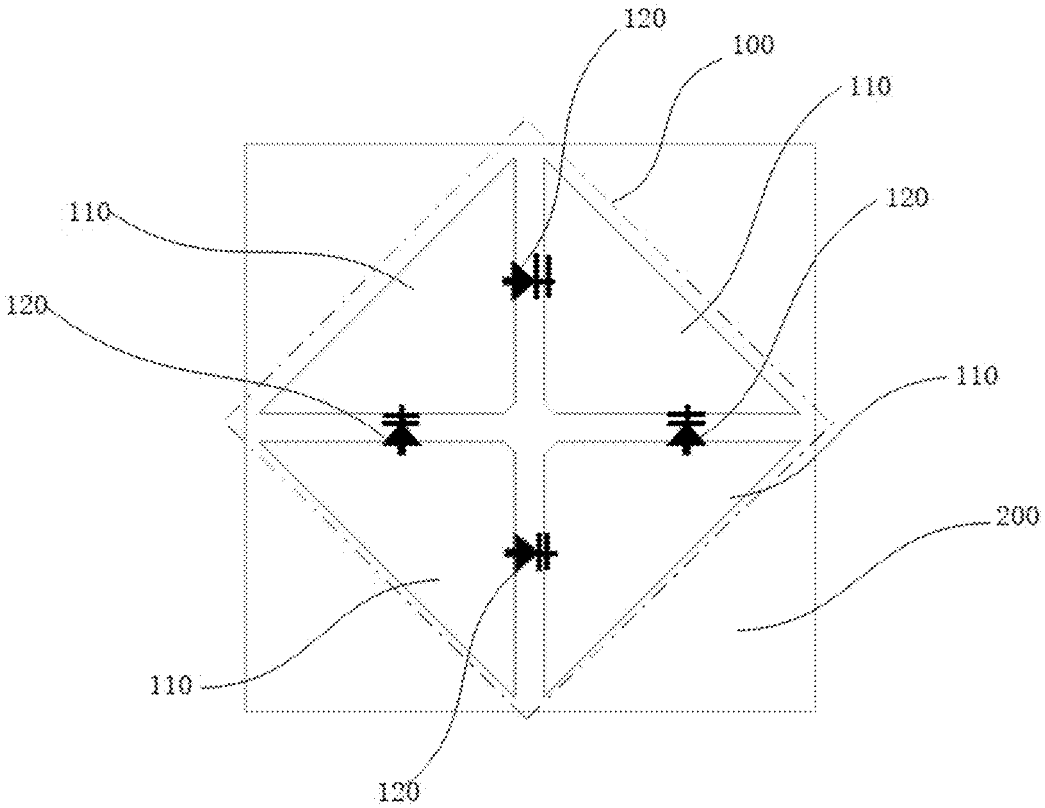
FIG. 6 is a top view of a metal structure with metal sheets arranged in isosceles trapezoids and diodes arranged in the same layer according to an embodiment of the present disclosure.

The structure of the metal structure 100 shown above can reduce the costs of a microwave diode 120 in a metal structure 100, but a wire needs to be threaded from the upper plane to the lower plane of the dielectric substrate unit 200, and two sets of wires need to be deployed, leading to high wiring costs. Therefore, to make the wiring in the metal structure 100 concentrated on the same plane, the metal structure 100 shown in FIG. 5 and FIG. 6 may be used. The metal structure 100 includes four microwave diodes 120, and the two metal units are arranged on the same plane of the dielectric substrate unit 200. Two adjacent metal sheets 110 are connected by one microwave diode 120, one of the two metal units is configured to connect to positive and negative electrodes of a direct current bias power supply, and a direction of the microwave diode 120 is the same as a direction of a current on the metal sheets 110. With further reference to FIG. 5 and FIG. 6, in an embodiment of the present disclosure, directions of forward current of two microwave diodes 120 connected to two metal sheets 110 in the metal unit configured to connect to the positive and negative electrodes of the direct current bias power supply are different. It can be learned from FIG. 5 and FIG. 6 that, directions of the forward current of the two microwave diodes 120 connected to the metal sheets 110 of the metal unit configured to connect to the power supply are clockwise and counterclockwise respectively, while directions of forward current of two microwave diodes 120 connected to metal sheets 110 of the metal unit which is not connected to the power supply are both clockwise or counterclockwise. In this way, metal sheets 110 at a lower left corner and an upper right corner of FIG. 6 may be respectively connected to the positive and negative electrodes of the power supply, such that two microwave diodes 120 connected to a metal sheet 110 at an upper left corner are connected in series, two microwave diodes 120 connected to a metal sheet 110 at a lower right corner are connected in series, and then the two groups of microwave diodes 120 are connected in parallel. Therefore, capacitance values of microwave diodes 120 of one metal structure 100 can be regulated by using one bias power supply, thereby saving a lot of wiring costs.

An embodiment of the present disclosure provides a radiation apparatus, including a multi-channel dual-polarized antenna array 1 and the air-interface electrically-tunable metasurface 2 described above. The multi-channel dual-polarized antenna array 1 includes a plurality of positive/negative 45-degree dual-polarized antenna units 11 configured to emit an electromagnetic wave signal. The air-interface electrically-tunable metasurface 2 is deployed directly above a radiation direction of the multi-channel dual-polarized antenna array 1 to adjust a phase of the electromagnetic wave signal emitted by the multi-channel dual-polarized antenna array 1.

In this embodiment of the present disclosure, the positive/negative 45-degree dual-polarized antenna units 11 are controlled to have a fixed difference between deflected phase values obtained after the electromagnetic wave signals pass through adjacent metal structures 100, to implement beam switching of the entire multi-channel dual-polarized antenna array 1. The multi-channel dual-polarized antenna array 1 is divided into a plurality of multi-channel dual-polarized antenna array units 13, and the multi-channel dual-polarized antenna array unit 13 includes a plurality of positive/negative 45-degree dual-polarized antenna units 11. The metal structure array in the air-interface electrically-tunable metasurface in this embodiment of the present disclosure is divided into a plurality of metal structure array units, the metal structure array unit includes a plurality of metal structures 100, and the metal structures 100 are one to one corresponding to the positive/negative 45-degree dual-polarized antenna units 11. Therefore, to enable electromagnetic wave signals emitted by adjacent positive/negative 45-degree dual-polarized antenna units 11 below to have a fixed phase difference after passing through adjacent metal structures 100, so as to implement beam deflection, the metal structure 100 may be connected to a direct current bias circuit. The direct current bias circuit is configured to adjust a capacitance value of a microwave diode 120 in the metal structure 100. Direct current bias circuits corresponding to adjacent metal structures 100 provide different direct current bias voltages, such that microwave diodes 120 in the adjacent metal structures 100 are controlled to have different capacitance values, thereby implementing beam switching.

Because the radiation apparatus provided in this embodiment of the present disclosure uses the air-interface electrically-tunable metasurface 2, the radiation apparatus can reduce the complexity of the rear-end feeding network of the multi-channel dual-polarized antenna array 1, reduce the system insertion loss, increase a gain of the multi-channel dual-polarized antenna array 1, and improve product reliability of the multi-channel dual-polarized antenna array 1, thereby meeting actual requirements of the multi-channel dual-polarized antenna array 1 in a base station. Therefore, the radiation apparatus in this embodiment of the present disclosure has competitive advantages in antenna products, and provides satisfactory user experience.

In the radiation apparatus provided in this embodiment of the present disclosure, the positive/negative 45-degree dual-polarized antenna unit 11 may be one of the following positive/negative 45-degree dual-polarized antennas:

a half-wave symmetric oscillator, a microstrip patch antenna, a magnetoelectric dipole antenna, or a dielectric resonator antenna.

The air-interface electrically-tunable metasurface in the embodiments of the present disclosure is illustrated below by way of an actual example.

Figure 11:
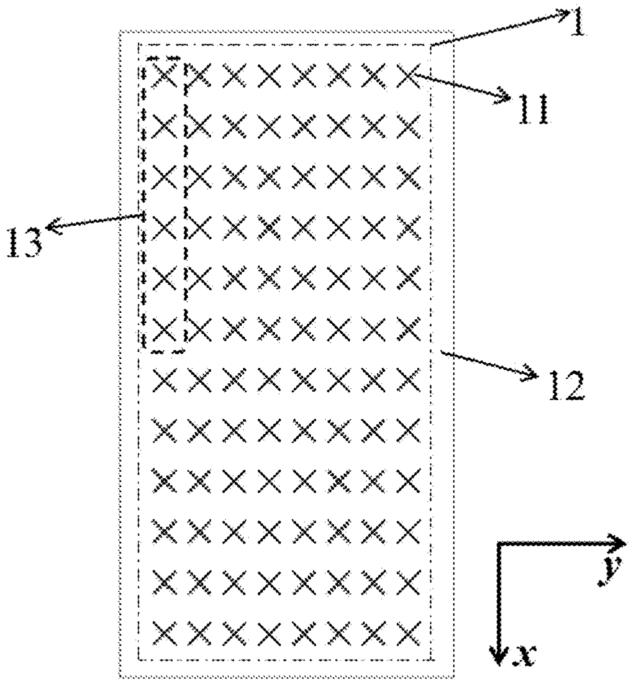
FIG. 11 is a schematic diagram of a layout of a multi-channel dual-polarized antenna array according to an embodiment of the present disclosure.
Figure 12:
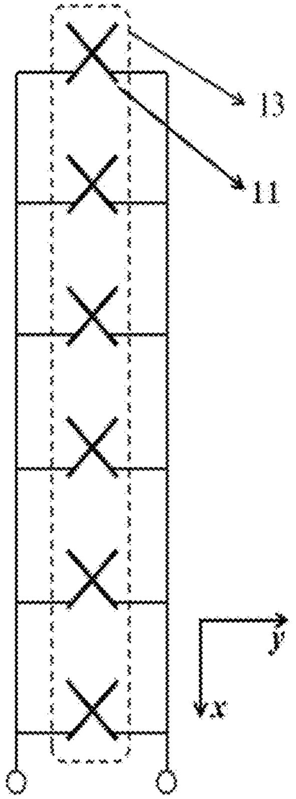
FIG. 12 is a schematic diagram of formation of a multi-channel dual-polarized antenna array unit according to an embodiment of the present disclosure.

The multi-channel dual-polarized antenna array 1 includes a plurality of multi-channel dual-polarized antenna array units, an antenna dielectric substrate, and a metal floor, as shown in FIG. 11. With reference to FIG. 11, 11 represents the positive/negative 45-degree dual-polarized antenna unit, 12 represents the antenna dielectric substrate, and 13 represents the multi-channel dual-polarized antenna array unit. In FIG. 11, the multi-channel dual-polarized antenna array unit 13 and the metal floor (not shown in FIG. 11) are respectively located on two sides of the antenna dielectric substrate 12, and the multi-channel dual-polarized antenna array 1 includes 96 positive/negative 45-degree dual-polarized antenna units 11 arranged on a plane along an x-axis and a y-axis. A spacing between positive/negative 45-degree dual-polarized antenna units 11 is about 0.67 wavelength along the x-axis and about 0.46 wavelength along the y-axis. In addition, along the x-axis, every six positive/negative 45-degree dual-polarized antenna units 11 are connected by a power divider to form one multi-channel dual-polarized antenna array unit 13. A specific connection manner is shown in FIG. 12. Two power dividers connect the six positive/negative 45-degree dual-polarized antenna units 11 along the x-axis to form two polarizations. The multi-channel dual-polarized antenna array unit 13 each column forms two channels, and the entire multi-channel dual-polarized antenna array 1 has a total of 32 channels.

To implement beam switching of each channel and reduce the complexity of the rear-end feeding network of the antenna array caused by the conventional electric tuning manner, a metasurface is used to electrically tune an air-interface beam, as shown in FIG. 2 to FIG. 12. The air-interface electrically-tunable metasurface 2 has a phase control function, whose tunable range covers an antenna operating frequency. The air-interface electrically-tunable metasurface 2 includes: a dielectric substrate, including a plurality of dielectric substrate units 200; and a metal structure array, including a plurality of metal structures 100. The metal structures 100 are arranged on the dielectric substrate units 200 and are one to one corresponding to positive/negative 45-degree dual-polarized antenna units 11. The positive/negative 45-degree dual-polarized antenna units 11 are arranged in the multi-channel dual-polarized antenna array 1. The metal structure 100 includes two metal units and a microwave diode 120, each metal unit includes two metal sheets 110, and the two metal units are symmetrically distributed around a center of the positive/negative 45-degree dual-polarized antenna unit 11. As shown in FIG. 3 and FIG. 4, the metal sheet 110 is in a shape of an isosceles trapezoid, upper bases of metal sheets 110 in the metal structure are perpendicular to each other, and the upper bases of the metal sheets 110 in the metal structure forms a regular quadrilateral with four gaps. The metal structure includes two microwave diodes 120, the two metal units are arranged on the same plane of a corresponding dielectric substrate unit 200. Two metal sheets 110 in one of the metal units are connected by one microwave diode 120 arranged on the same plane, and two metal sheets 110 in the other metal unit are each provided with a metal via hole 130. Each metal via hole 130 corresponds to a metal pad 140 provided on the other plane of the dielectric substrate unit 200, and the two metal pads 140 are connected by the other microwave diode 120 arranged on the same plane. Directions of forward current of the two microwave diodes 120 are different, and correspond to positive 45-degree polarization and negative 45-degree polarization, respectively. In this way, the metal sheets 110 and the microwave diodes 120 cooperate to adjust a phase of a positive 45-degree polarized or negative 45-degree polarized electromagnetic wave signal emitted by the positive/negative 45-degree dual-polarized antenna unit 11, and then a bias voltage value of a direct current power supply in every two corresponding microwave diodes 120 can be adjusted such that a single beam has a specific phase difference when transmitted through adjacent periodic metal structures 100, thereby realizing electrical tuning of an air-interface beam of the multi-channel dual-polarized antenna array 1.

Figure 13:
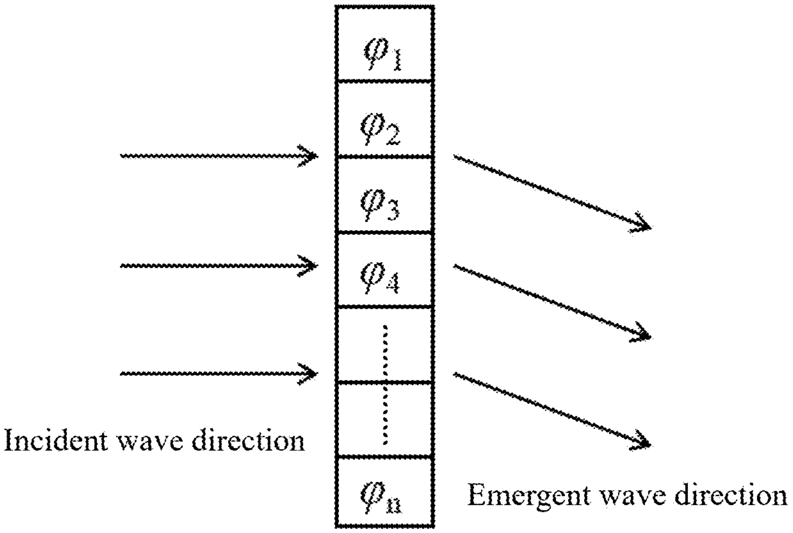
FIG. 13 is a schematic diagram of beam deflection of an air-interface electrically-tunable metasurface according to an embodiment of the present disclosure.

A technology of electrically tuning an air-interface beam is used, and a phase-adjustable periodic structure with a dual-polarization characteristic is used to design a metasurface required for air-interface electric tuning. A principle of an air-interface beam in the embodiments of the present disclosure is as follows. As shown in FIG. 13, on a beam propagation path, a bias voltage value of a direct current power supply in every two corresponding microwave diodes 120 in the designed air-interface electrically-tunable metasurface 2 is adjusted to achieve changes of phases $\phi_1$ to $\phi_n$ obtained when an incident plane wave passes through the metasurface. In this example, an electromagnetic wave signal emitted by each positive/negative 45-degree dual-polarized antenna unit 11 has an initial phase value at the beginning, and then a capacitance value of two corresponding microwave diodes 120 in a metal structure corresponding to the positive/negative 45-degree dual-polarized antenna unit 11 in the air-interface electrically-tunable metasurface is controlled by changing a direct current bias voltage, to change a phase value of the electromagnetic wave signal emitted by the positive/negative 45-degree dual-polarized antenna unit 11 from the initial phase value to a deflected phase value. For example, a phase value of an electromagnetic wave signal emitted by a first positive/negative 45-degree dual-polarized antenna unit 11 is changed from an initial phase value to $\phi_1$, a phase value of an electromagnetic wave signal emitted by a second positive/negative 45-degree dual-polarized antenna unit 11 is changed from an initial phase value to $\phi_2$, a phase value of an electromagnetic wave signal emitted by a third positive/negative 45-degree dual-polarized antenna unit 11 is changed from an initial phase value to $\phi_3$, and so on, and $\phi_2-\phi_1=\phi_3-\phi_2= \ldots \phi_n-\phi_{n-1}$. In this way, a specific phase difference is controlled to be formed between adjacent periodic metal structures 100. Then, a local phase of the incident plane wave is adjusted such that an equiphase surface of a radiation field is deflected after passing through the air-interface electrically-tunable metasurface 2, and then an overall radiation direction of the antenna is controlled at the air interface to implement beam deflection/switching.

A conventional mechanical electrically-tunable structure is replaced by the air-interface electrically-tunable metasurface 2, and a transmission phase of the periodic metal structure 100 of the air-interface electrically-tunable metasurface is controlled by using an external voltage, to implement beam deflection/switching. Compared with the conventional electric tuning manner, the air-interface electrically-tunable metasurface 2 can effectively reduce the complexity of the rear-end feeding network of the antenna array, reduce the system insertion loss, improve an antenna gain, and improve reliability of an antenna product.

The form of the periodic metal structure 100 of the air-interface electrically-tunable metasurface 2 is not limited to the foregoing form of the metal structure 100, and may be other metal structures 100 with a positive/negative 45-degree dual-polarization characteristic. The air-interface electrically-tunable metasurface 2 in this example is located above the multi-channel dual-polarized antenna array 1, and a height from a surface of the multi-channel dual-polarized antenna array 1 does not exceed 0.25 wavelength.

The number of periodic metal structures 100 of the air-interface electrically-tunable metasurface in this example is determined by an antenna array surface, and it should be ensured that the air-interface electrically-tunable metasurface 2 can cover an emission range of the antenna array surface.

For selection of the microwave diode 120 in this example, a required phase difference may be determined according to an antenna frequency, a maximum deflection angle of a required radiation field, and a size of the periodic metal structure 100 of the air-interface electrically-tunable metasurface 2, and finally, a microwave diode 120 that can meet requirements within an operating frequency is searched for according to the range.

The air-interface electrically-tunable metasurface provided in the embodiments of the present disclosure has at least the following beneficial effects.

In accordance with the air-interface electrically-tunable metasurface provided in the embodiments of the present disclosure, the metal structures are one to one corresponding to the positive/negative 45-degree dual-polarized antenna units in the multi-channel dual polarized antenna array. The metal structure includes two metal units and a microwave diode, each metal unit includes two metal sheets, and the two metal units are symmetrically distributed around the center of the positive/negative 45-degree dual-polarized antenna unit. Therefore, in the embodiments of the present disclosure, a magnitude of a direct current bias voltage applied to positive and negative electrodes of the microwave diode in the metal structure is controlled to adjust a phase of a positive 45-degree polarized or negative 45-degree polarized electromagnetic wave signal emitted by the positive/negative 45-degree dual-polarized antenna unit. Finally, deflected phase values of adjacent metal structures are controlled to have a fixed difference, to implement beam deflection of the entire multi-channel dual-polarized antenna array. Therefore, the embodiments of the present disclosure can reduce the complexity of the rear-end feeding network of the multi-channel positive/negative 45-degree dual-polarized antenna array, reduce the system insertion loss, increase a gain of the multi-channel positive/negative 45-degree dual-polarized antenna array, and improve product reliability of the multi-channel positive/negative 45-degree dual-polarized antenna array, meeting actual requirements of the multi-channel positive/negative 45-degree dual-polarized antenna array in a base station.

Some embodiments of the present disclosure are described above, but the present disclosure is not limited to these embodiments. Those having ordinary skills in the art can make various equivalent variants or replacements without departing from the scope of the present disclosure. Such equivalent variants or replacements are all encompassed within the scope defined by the claims of the present disclosure.

What is claimed is:

1. An air-interface electrically-tunable metasurface, comprising:

- a dielectric substrate, comprising a plurality of dielectric substrate units; and
- a metal structure array, comprising a plurality of metal structures arranged on the dielectric substrate units and one to one corresponding to positive/negative 45-degree dual-polarized antenna units, wherein the metal structure comprises two metal units and a microwave diode, each metal unit comprises two axisymmetrically distributed metal sheets, the two metal units are symmetrically distributed around a center of the positive/negative 45-degree dual-polarized antenna unit, and the metal sheets and the microwave diode cooperate to adjust a phase of a positive 45-degree polarized or negative 45-degree polarized electromagnetic wave signal emitted by the positive/negative 45-degree dual-polarized antenna unit.

2. The air-interface electrically-tunable metasurface of claim 1, wherein the metal sheet is in a shape of an isosceles trapezoid, and upper bases of two adjacent metal sheets in the metal structure are perpendicular to each other.

3. The air-interface electrically-tunable metasurface of claim 1, wherein the metal sheet is in a shape of a sector, and a 90-degree angle is formed between two adjacent metal sheets in the metal structure.

4. The air-interface electrically-tunable metasurface of claim 1, wherein the metal sheet is in a shape of a rectangle, and short sides of two adjacent metal sheets in the metal structure are perpendicular to each other.

5. The air-interface electrically-tunable metasurface of claim 2, wherein the metal structure comprises four microwave diodes, the two metal units are arranged on the same plane of the dielectric substrate unit, two adjacent metal sheets are connected by one microwave diode, one of the two metal units is configured to connect to positive and negative electrodes of a direct current bias power supply, and a direction of the microwave diode is the same as a direction of a current on the metal sheets.

6. The air-interface electrically-tunable metasurface of claim 2, wherein the metal structure comprises two microwave diodes, the two metal units are arranged on the same plane of the dielectric substrate unit, the two microwave diodes are respectively arranged on upper and lower planes of the dielectric substrate unit, two metal sheets in each metal unit are connected by one of the microwave diodes, and the two metal units are respectively connected to positive and negative electrodes of a direct current bias power supply.

7. The air-interface electrically-tunable metasurface of claim 6, wherein the metal structure further comprises metal via holes and metal pads, and two metal sheets of one of the two metal units are connected to the microwave diode through the metal pads and the metal via holes.

8. The air-interface electrically-tunable metasurface of claim 1, wherein the air-interface electrically-tunable metasurface is arranged directly above a radiation direction of a multi-channel dual-polarized antenna array, and a height of the air-interface electrically-tunable metasurface from the multi-channel dual-polarized antenna array does not exceed 0.25 wavelength.

9. A radiation apparatus, comprising: a multi-channel dual-polarized antenna array and an air-interface electrically-tunable metasurface, the air-interface electrically-tunable metasurface comprising:

- a dielectric substrate, comprising a plurality of dielectric substrate units; and
- a metal structure array, comprising a plurality of metal structures arranged on the dielectric substrate units and one to one corresponding to positive/negative 45-degree dual-polarized antenna units, wherein the metal structure comprises two metal units and a microwave diode, each metal unit comprises two axisymmetrically distributed metal sheets, the two metal units are symmetrically distributed around a center of the positive/negative 45-degree dual-polarized antenna unit, and the metal sheets and the microwave diode cooperate to adjust a phase of a positive 45-degree polarized or negative 45-degree polarized electromagnetic wave signal emitted by the positive/negative 45-degree dual-polarized antenna unit,
  - wherein the multi-channel dual-polarized antenna array comprises a plurality of positive/negative 45-degree dual-polarized antenna units configured to emit an electromagnetic wave signal, and the air-interface electrically-tunable metasurface is arranged directly above a radiation direction of the multi-channel dual-polarized antenna array to adjust a phase of the electromagnetic wave signal emitted by the multi-channel dual-polarized antenna array.

10. The radiation apparatus of claim 9, wherein the multi-channel dual-polarized antenna array is divided into a plurality of multi-channel dual-polarized antenna array units, the multi-channel dual-polarized antenna array unit comprises a plurality of positive/negative 45-degree dual-polarized antenna units, the metal structure array in the air-interface electrically-tunable metasurface is divided into a plurality of metal structure array units, the metal structure array unit comprises a plurality of metal structures, the multi-channel dual-polarized antenna array units are one to one corresponding to the metal structure array, the metal structure is connected to a direct current bias circuit, and the direct current bias circuit is configured to adjust a capacitance value of the microwave diode in the metal structure.

11. The radiation apparatus of claim 9, wherein the positive/negative 45-degree dual-polarized antenna unit is one of the following positive/negative 45-degree dual-polarized antennas:

a half-wave symmetric oscillator, a microstrip patch antenna, a magnetoelectric dipole antenna, or a dielectric resonator antenna.

12. The air-interface electrically-tunable metasurface of claim 3, wherein the metal structure comprises four microwave diodes, the two metal units are arranged on the same plane of the dielectric substrate unit, two adjacent metal sheets are connected by one microwave diode, one of the two metal units is configured to connect to positive and negative electrodes of a direct current bias power supply, and a direction of the microwave diode is the same as a direction of a current on the metal sheets.

13. The air-interface electrically-tunable metasurface of claim 4, wherein the metal structure comprises four microwave diodes, the two metal units are arranged on the same plane of the dielectric substrate unit, two adjacent metal sheets are connected by one microwave diode, one of the two metal units is configured to connect to positive and negative electrodes of a direct current bias power supply, and a direction of the microwave diode is the same as a direction of a current on the metal sheets.

14. The air-interface electrically-tunable metasurface of claim 3, wherein the metal structure comprises two microwave diodes, the two metal units are arranged on the same plane of the dielectric substrate unit, the two microwave diodes are respectively arranged on upper and lower planes of the dielectric substrate unit, two metal sheets in each metal unit are connected by one of the microwave diodes, and the two metal units are respectively connected to positive and negative electrodes of a direct current bias power supply.

15. The air-interface electrically-tunable metasurface of claim 4, wherein the metal structure comprises two microwave diodes, the two metal units are arranged on the same plane of the dielectric substrate unit, the two microwave diodes are respectively arranged on upper and lower planes of the dielectric substrate unit, two metal sheets in each metal unit are connected by one of the microwave diodes, and the two metal units are respectively connected to positive and negative electrodes of a direct current bias power supply.

16. The radiation apparatus of claim 9, wherein the metal sheet is in a shape of an isosceles trapezoid, and upper bases of two adjacent metal sheets in the metal structure are perpendicular to each other.

17. The radiation apparatus of claim 9, wherein the metal sheet is in a shape of a sector, and a 90-degree angle is formed between two adjacent metal sheets in the metal structure.

18. The radiation apparatus of claim 9, wherein the metal sheet is in a shape of a rectangle, and short sides of two adjacent metal sheets in the metal structure are perpendicular to each other.

19. The radiation apparatus of claim 16, wherein the metal structure comprises four microwave diodes, the two metal units are arranged on the same plane of the dielectric substrate unit, two adjacent metal sheets are connected by one microwave diode, one of the two metal units is configured to connect to positive and negative electrodes of a direct current bias power supply, and a direction of the microwave diode is the same as a direction of a current on the metal sheets.

20. The radiation apparatus of claim 16, wherein the metal structure comprises two microwave diodes, the two metal units are arranged on the same plane of the dielectric substrate unit, the two microwave diodes are respectively arranged on upper and lower planes of the dielectric substrate unit, two metal sheets in each metal unit are connected by one of the microwave diodes, and the two metal units are respectively connected to positive and negative electrodes of a direct current bias power supply.

* * * * *